Dec. 29, 1931.       H. R. MILLS       1,839,112
ELECTRICAL COOKING MACHINE
Filed April 27, 1928    3 Sheets-Sheet 1
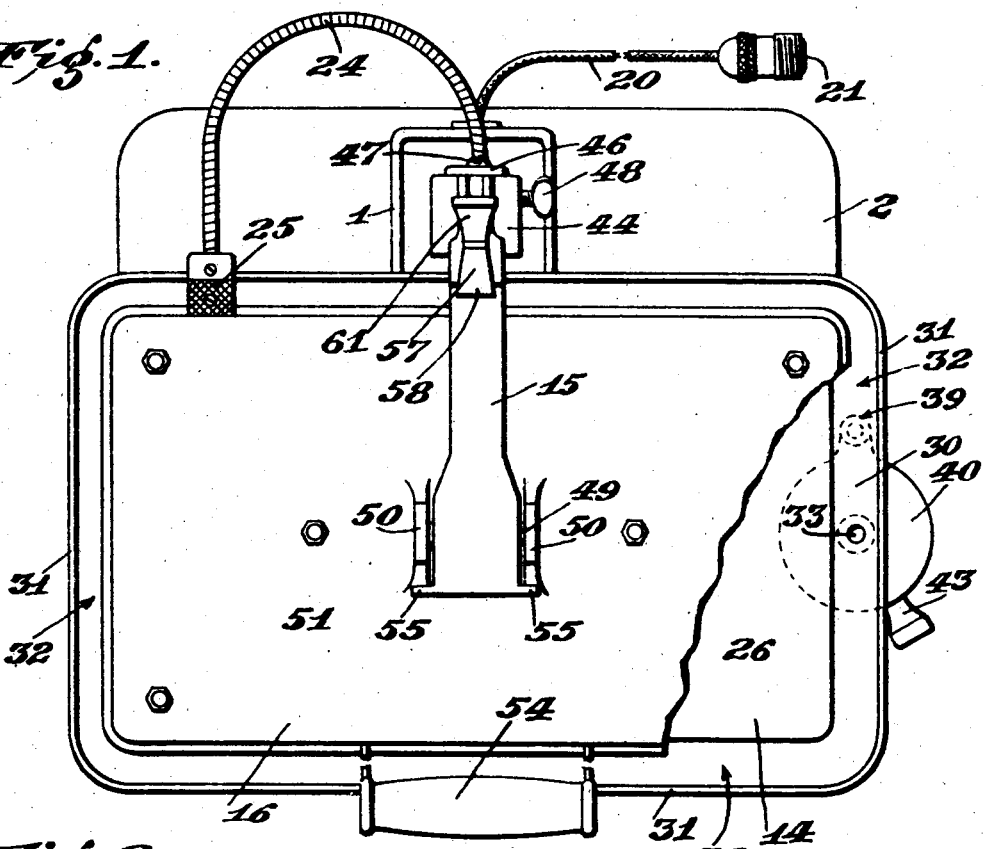
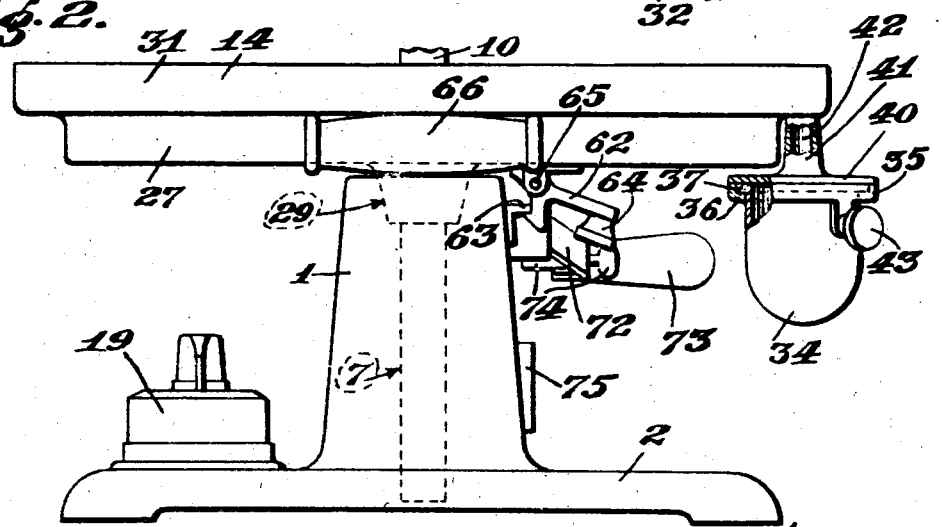
Inventor:
Harry R. Mills,
By George A. Pennington Dec. 29, 1931. H. R. MILLS 1,839,112
ELECTRICAL COOKING MACHINE
Filed April 27, 1928 3 Sheets-Sheet 2

Inventor:
Harry R. Mills,
By George A. Pennington
his Atty

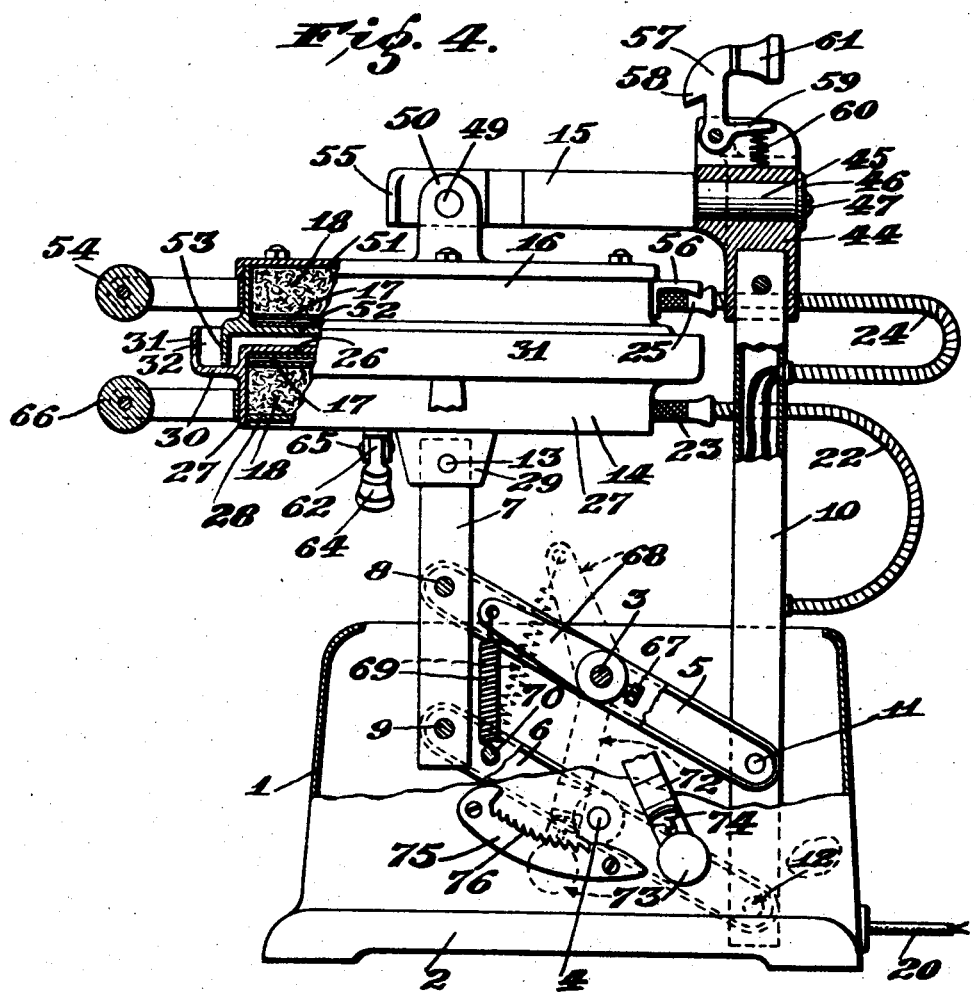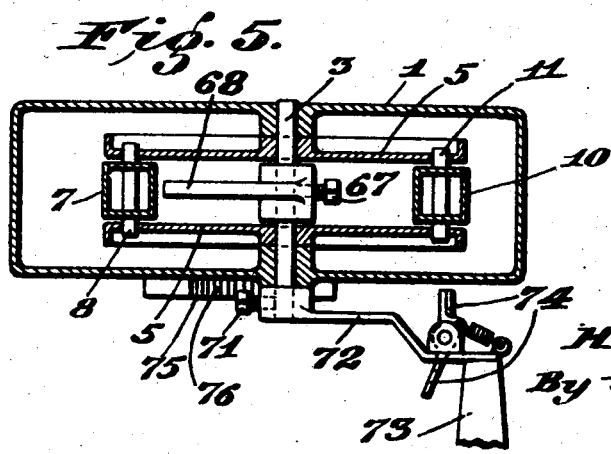

Patented Dec. 29, 1931

1,839,112

UNITED STATES PATENT OFFICE

HARRY R. MILLS, OF ST. LOUIS, MISSOURI, ASSIGNOR, BY MESNE ASSIGNMENTS, TO ERNEST REICH, OF CHICAGO, ILLINOIS

ELECTRICAL COOKING MACHINE

Application filed April 27, 1928. Serial No. 273,371.

This invention relates to electrical cooking devices. It has for its principal objects to produce a simple and compact, yet relatively capacious, highly efficient and practical machine which is readily adjustable and easy to manipulate so that it can be used to advantage in various cooking operations, including baking, frying, roasting, toasting, etc. Other objects and advantages to be attained will more fully appear in the following description.

The invention consists in the novel structural and operating features hereinafter described, and in the parts and combinations and arrangements of parts afterwards pointed out with particularity in the appended claims.

Generally stated, the invention comprehends broadly a machine comprising an upper and a lower cooking plate which are supported in normally counterbalanced co-operative relation so as to be easily movable vertically with respect to each other, the lower plate, for certain cooking operations, constituting the support for the article or material to be cooked and the upper plate affording a cover therefor, there being provision for exerting controllable and variable pressure upon the plates whereby to compress the article or material between them, at the will of the operator, and there being further provision for reversing the upper cooking plate on its support and maintaining it at an elevation above the lower cooking plate, so that either one or both of said plates may be used, at will, for such cooking operations that are usually carried out upon an ordinary griddle or hot-plate.

In the accompanying drawings forming part of this specification and illustrating a practical adaptation of the invention,—

Figure 1 is a top plan view of the machine, a portion of the upper cooking plate being broken away so as to expose the underlying portion of the lower cooking plate;

Figure 2 is a front view of the base standard and the lower cooking plate, the latter being in lowered position;

Figure 4 is an end view of the machine, the upper and lower cooking plates being brought together in closed cooking relation; and Figure 5 is a horizontal cross section through the base standard taken on or about the line 5—5 of Figure 3.

Figure 3:
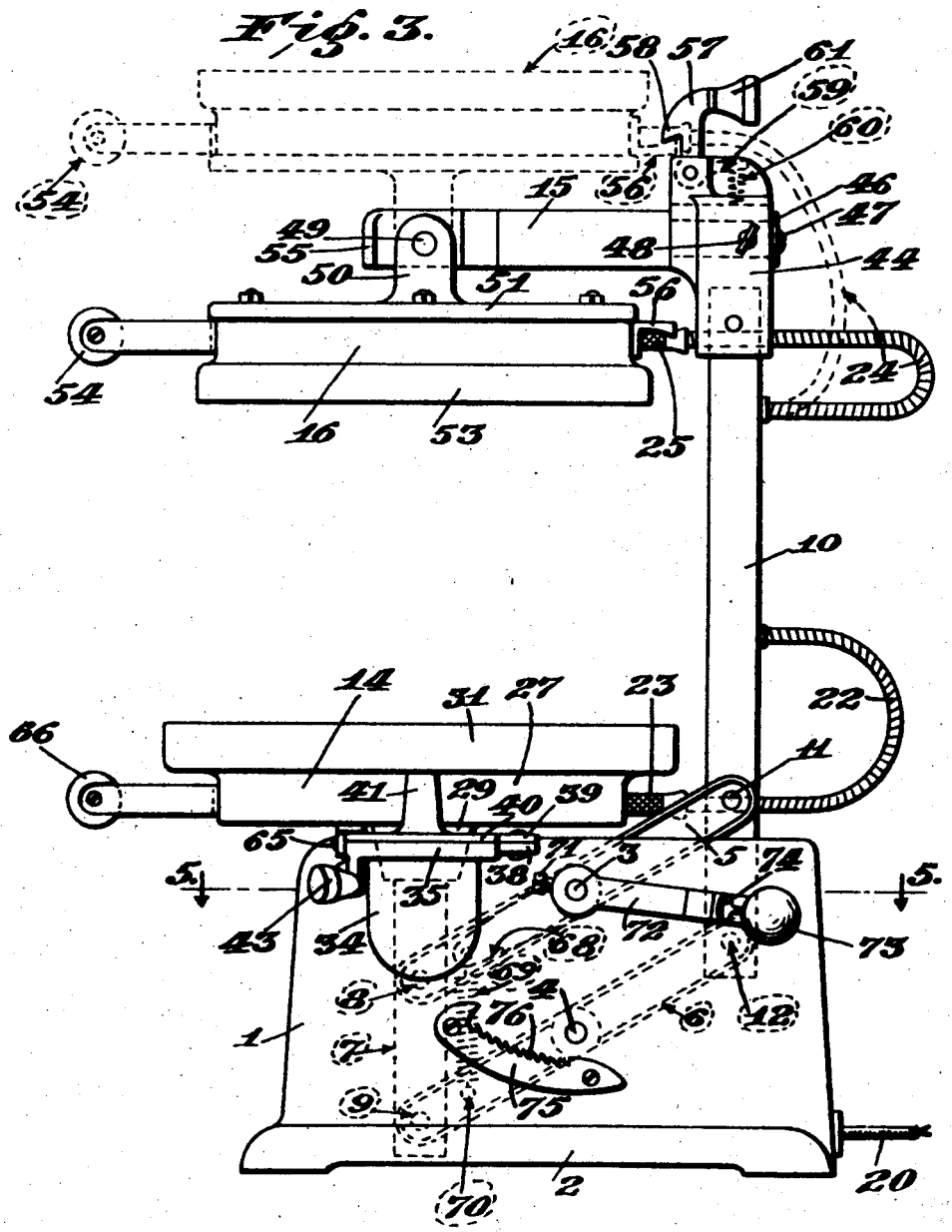
Figure 3 is an end view of the machine, the upper cooking plate being in raised position and the lower cooking plate being in lowered position.

Referring now to the drawings, the numeral 1 designates the base standard of the machine, including an upstanding hollow shell or housing which is substantially rectangular in horizontal cross section and is mounted on and preferably integral with a hollow foot-plate 2.

Pivotally mounted on transverse shafts 3, 4, within the base standard 1, are two pairs of rocking levers 5, 6, respectively. These levers are pivotally attached at their forward ends to a vertical carrier member or supporting bar 7, as at 8 and 9, respectively, the levers being thereby maintained at all times in parallel relation to each other, and the member 7 in vertical position.

At their rear ends said levers 5 and 6 are pivotally attached to a second vertical carrier member or supporting bar 10, as at 11 and 12, respectively, said member 10 being thereby maintained at all times in vertical position and in parallel relation to said first-mentioned member 7.

Mounted on the upper end portion of the member 7, as at 13, is a cooking plate 14 which is heated electrically and whose details of structure will be presently described, while supported on a horizontal arm 15 at the upper end portion of the member 10 is a second cooking plate 16 which is also electrically heated and whose details of structure and co-operation with the first mentioned plate will be later described.

Each of said cooking plates is made hollow and contains an electrical heating element 17 which may be of any suitable and desirable construction, said element, of course, being located in close proximity to the cooking surface of the plate but electrically insulated therefrom in any approved manner and the chamber in which the heating element is located being obviously filled with asbestos or other suitable heat confining and insulating material, as indicated by the numeral 18 (see Figure 4 of the drawings).

The heating of the cooking plates is controlled by a suitable switch 19 which may be conveniently located on the foot-plate 2 of the base standard 1, as shown in Figure 2 of the drawings, said switch being preferably of a three-way type and accordingly wired to the respective plates 14 and 16 so as to give to them three stages or different degrees of heat, namely, high, medium and low, and it being connected in use through an ordinary cord 20 and plug 21 to a regular electric light socket or in any other suitable manner to an outlet from a source of electrical supply.

The electrical conducting wires from the switch 19, which it is not deemed necessary to illustrate in full detail in the drawings, may be conveniently carried into the hollow base standard from below and thence up through the vertical carrier member 10, which latter, for this purpose in particular, is made tubular and preferably square in cross section (see Figures 4 and 5). The wires for connecting the lower cooking plate 14 are taken out from the member 10 through a flexible metal conduit 22 at the end of which is the usual plug 23 of the type that is ordinarily used to connect electrical appliances, there being, of course, the usual pair of projecting terminal studs (not shown) on the cooking plate for the reception of the plug and being obviously connected with the heating element 17 in the plate. A similar conduit 24, having a plug 25, is provided for connecting the upper cooking plate 16. By these provisions it is quite obvious that either one or both of the cooking plates may be heated, at will, it being an easy matter to attach and detach the respective plugs 23 and 25.

The details of the lower cooking plate 14 will now be described. The main body portion of this member is preferably an integral structure and may be produced by casting, stamping or any other suitable method. It comprises a flat surfaced cooking plate proper 26, which, as shown, is generally rectangular, and from the edges of which depends side and end flanges 27 producing an inverted box-like shell or housing which is closed by a removable plate 28, said closure plate being secured in place in any desirable manner and having thereon a depending central boss or lug 29 having a socket to receive the upper end portion of the vertical carrier member 7, the parts being conveniently secured together by a cross-pin or rivet 13 hereinbefore referred to in a general way.

Extending outwardly from the side and end walls 27 of the cooking plate 14, in a plane somewhat below the upper face of the plate portion proper 26, is a surrounding horizontal ledge 30, at the margin of which latter is an upstanding flange 31 which projects a considerable distance above the upper face of the plate portion 26, thus producing a channel 32 into which excess grease and moisture extracted from the article or material being cooked on the plate will flow.

Drainage of the channel 32 is effected through an aperture 33 in the ledge 30 at one end of the plate and into a receptacle 34 supported thereunder. The mounting of the receptacle 34 is preferably accomplished by placing it detachably upon a horizontally swingable ring member 35 having an internal annular flange 36 upon which is seated an external annular flange 37 provided on the receptacle. The member 35 is provided with an ear 38 which is hingedly attached to a similar ear 39 on a supporting plate 40 which serves as a cover for the receptacle, said plate 40 having a tubular neck or shank extension 41 which is secured firmly to the under side of the ledge 30 with its bore 42 in register with said aperture 33. On the ring member 35 is a handle 43 for convenience in swinging said member clear of the supporting plate 40 when it is desired to remove and replace said receptacle 34.

Mounted on the upper end portion of the vertical carrier member 10 is a bracket 44 to which is attached the hereinbefore mentioned horizontal arm 15 which supports the upper cooking plate 16. In order to minimize the weight of said arm 15 it is preferably made hollow throughout its major body portion, and, to provide for rotative adjustment of said arm, as will be presently described, it has a cylindrical shank or bearing extension 45 which is fitted rotatably into a bore provided therefor in said bracket member 44 and being retained in place by a collar 46, which latter is secured to the shank by an axial screw 47. Suitable locking means, preferably a set-screw 48, as shown, is provided on the bracket member 44 so as to releasably engage the shank portion 45 whereby said arm 15 can be held in its adjusted position.

The forward portion of the arm 15 is preferably made somewhat wider than the remainder thereof, and through this portion is passed a transverse pivot pin or shaft 49, hinged on the end portions of which latter are lugs or ears 50 that project up from the closure member 51 of the hollow upper cooking plate 16. By this arrangement the upper plate 16 is swingably supported on the arm 15 about the axis of said transverse pivot pin or shaft 49, and, preferably, there is provided a slight amount of play in the bearings between said pin or shaft 49 and the lugs or ears 50 so that the cooking plate 16 may have limited tilting movement transversely of the supporting arm 15. In this way the plate 16 is capable of a somewhat universal tilting movement on the arm 15 so that, when said plate 16 co-operates with the lower plate 14 and is brought into contact with the top surface of material to be cooked between the plates, it will compensate for unevenness in the thickness of the material.

Surrounding the cooking surface 52 of the upper plate 16 is a marginal flange 53 which enters the channel 32 of the lower plate 14, said flange being of such depth that when it comes in contact with the bottom of the channel the distance between the cooking faces 26, 52, respectively, of the two plates 14 and 16, is that for a minimum thickness of material to be cooked between the plates with its upper and lower surfaces in contact with the respective cooking surfaces of the plates and just touching lightly and without receiving any appreciable pressure from the plates.

By the provision of the flange 53 on the upper cooking plate 16 to co-operate with the flange 31 of the lower cooking plate 14 an effective closure is afforded for different thicknesses of material up to a certain maximum so as to retain the moisture usually evaporated and wasted in ordinary open griddle cooking operations and thereby produce a more deliciously flavored and palatable article of food with practically no appreciable shrinkage thereof in the cooking operation.

When it is desired to reverse the position of the upper cooking plate 16 on the arm 15, as shown by dotted lines in Figure 3 of the drawings, it may be readily accomplished by the operator grasping a manipulating handle 54, preferably of the spade handle type, which, as shown, is secured to the front portion of the plate, the set-screw 48, of course, being first loosened, and after the plate has been reversed, said set-screw being again tightened against the shank portion 45 of the arm 15.

In order to limit the swinging movement of the plate 16 on its pivotal support 49, the outer end portion of the arm 15 has lateral lugs 55 provided thereon which are engaged by the lugs 50 when the plate is moved in one direction, its movement in the opposite direction being limited by the under side of the arm 15 itself against which the rear portion of the plate comes in contact.

In its reversed position the cooking plate 16 is held steady by a lug or bracket member 56 on its rear portion which rests upon the top of the bracket member 44 and is engaged on its upper side by a spring-pressed latch element 57 on said bracket member 44. Obviously, the latch element 57, owing to its peculiarly formed hooked portion 58 and the arrangement of its bell-crank extension 59 with which the spring 60 co-operates, will automatically latch the plate 16 when it is swung into its reversed position as shown, and it is readily released by the operator grasping the handle portion 61 thereof with one hand while he manipulates the plate 16 with his other hand when it is desired to restore the plate to its normal pendant position on the arm 15.

In order to hold the two cooking plates 14 and 16 in their normal separated positions, as shown in Figure 3 of the drawings, a latch element 62 (see Figures 2 and 4 of the drawings) is mounted on the under side of the lower plate 14 so as to engage a lug or bracket member 63 on the side of the base standard 1. As shown, this latch element is of the gravitating type, its handle portion 64 overbalancing the remainder thereof on its pivot 65, but, obviously, a spring-pressed type of latch may be used similar to the hereinbefore mentioned latch element 57 for the upper plate 16. As hereinbefore described, the two plates 14 and 16, through their peculiar supporting arangements, are normally counterbalanced and they will ordinarily remain at different elevations to which they happen to be moved, but it is preferable to provide the releasable latch element 62, just above described, particularly to hold the plates separated, as shown in Figure 3, when the lower plate 14 is being used for open griddle cooking operations, this locking of the lower plate 14 being also of material advantage in holding the supporting member 10 in normal elevated position while the upper plate 16 is being reversed on the arm 15.

To move the two cooking plates 14, 16, towards and from each other, the operator may grasp either the handle 54 provided on the upper plate 16 or a similar handle 66 provided on the front portion of the lower plate 14, or he may grasp both of said handles, taking hold of one with each hand.

In some cooking operations, particularly in toasting bread, it is desirable to merely bring the cooking surface 52 of the upper plate 16 into contact with the upper face of the slice of bread on the lower plate 14 and without any appreciable pressure thereon. The normally counterbalanced supporting arrangement for the two plates permits of this being easily accomplished. However, in other cooking operations, such as frying steaks, chops and meats or articles of other character, it is desirable to exert pressure upon the material being cooked, and, to this end, means is preferably provided whereby a variable pressure, say, for example, from a few ounces up to ten pounds or more, can be exerted at the will of the operator.

Normally, the rocking levers 5, 6, are movable freely about the shafts 3, 4, and the respective upright carrier members 7, 10, and the cooking plates 14, 16, correlated working parts and electrical connections carried thereby are counterbalanced as hereinbefore set forth, and the operator can move the cooking plates towards and from each other without any great effort on his part, but, without the provision of the means now to be described, the operator would be required to retain hold of the handles 54 and 66 during the entire cooking operation if pressure is to be exerted on the cooking plates to compress the material being cooked between them.

The lower shaft 4 may be mounted either rotatably or non-rotatably in the base standard 1, as desired, but the upper shaft 3 is rotatable, and fixed thereon, as by a set-screw 67, is an arm 68, said arm 68 being located between the upper pair of rocking levers 5 and extending forwardly from the shaft and terminating in proximity of the upright carrier member 7, its free end portion being connected by a spring 69 to a cross-pin 70 on the lower pair of rocking levers 6.

Fixedly secured on the end portion of the upper shaft 3, outside of the base standard 1, as by a set-screw 71, is a lever or crank arm 72 having an operating handle 73 thereon, said crank arm being provided with a latch element 74 to releasably engage an arcuate rack member 75 that is secured on the base standard 1 below the shaft 3.

Normally, when the cooking plates 14, 16, are moved up and down, the arm 68 and crank 72, owing to the spring connection 69 with the lower rocking levers 6, swing correspondingly with the movement of the rocking levers 5, 6, but the normal set of the crank arm 72 and the relative location of the arcuate rack member 75 are such that the latch element 74 on the crank arm 72 does not automatically engage the teeth or serrations 76 on the rack member. In this way the counterbalancing effect of the cooking plates 14, 16, is not normally interfered with, but after the cooking plates have been brought together, as shown in Figure 4 of the drawings, the crank arm 72 may be pulled forwardly until its latch element 74 engages the serrated portion of the rack member 75, by which action the arm 68 is swung upwardly thereby stretching the spring 69 so that the tension of the spring tends to force the two cooking plates closer together and thereby creates a pressure upon the interposed material being cooked. It will thus be seen that by adjusting the crank arm 72 to different engaging positions on the rack member 75 the power of the spring 69 may be varied at the will of the operator to suit the different cooking conditions to be met.

In addition to the special facilities for operating the cooking machine of the present invention, there is a special advantage in the novel details of construction of the bodies of the upper and lower cooking plates, for, by making the cooking portions proper 26 and 52 integral with the side and end walls 27 and without seamed jointure through which grease might seep, and by further providing the marginal flanges 31 and 53, respectively, the interiors of the body shells of the respective cooking plates are kept free of grease which might otherwise find its way into them and have a deleterious effect on the insulation material and heating elements as well as throwing off unpleasant fumes.

While, for general use, the cooking surfaces of the plates 14, 16, will almost invariably be flat and smooth, obviously, however, in some cases, the cooking surfaces may be corrugated or ribbed or otherwise configured; and it is further obvious that a suitable oven shell or housing, having regular side walls in one of which is provided a door, but being open at top and bottom or at least having a perforated or foraminous top and bottom, may be placed between the upper and lower cooking plates, the bottom marginal portions of the oven shell being seated in the channel portion 32 of the lower plate 14 and thereby supported, while the upper plate 16 affords a closure at the top of the oven, the flange 53 of the upper plate 16 overlapping the top marginal portions of the oven shell. The oven shell, owing to the relative movability of the two cooking plates 14, 16, can be readily placed in position and removed, at will, and, when interposed between the plates, it is securely held in place by the plate flanges 31 and 53, respectively, and by the clamping action of the two plates under the power of the spring 69 when the crank arm 72 is pulled forward and its latch element 74 is engaged with the rack member 75.

In practice, the oven may be heated from both of the cooking plates 14 and 16, or from either the one or the other thereof, as may be desired, as the plug 23 or 25 of the conduit 22 or 24, as the case may be, can be readily detached from its particular plate, at will. In this way the heating of the oven may be regulated at the will of the operator and to take care of different conditions in oven cooking operations.

Obviously, the structure and arrangement of the machine in general admits of considerable alteration and modification without in the least departing from the spirit and scope of the invention as defined by the appended claims. The invention, therefore, is not limited to the specific construction and arrangement shown in the accompanying drawings.

What is claimed is:

1. In an electrical cooking machine, a base standard, upper and lower parallel rocking levers mounted in said base standard, a vertical carrier member hingedly mounted on the forward end portions of said rocking levers, a second vertical carrier member hingedly mounted on the rear end portions of said rocking levers, said two vertical carrier members moving vertically in parallel relation to each other, a lower cooking plate mounted on the upper end portion of said first mentioned vertical carrier member, a normally inverted upper cooking plate mounted on said second mentioned vertical carrier member in co-operative relation to said lower cooking plate, means for reversing said upper cooking plate on its support, means for releasably locking said upper cooking plate in its reversed position, the weight of the two cooking plates and their respective supporting elements being counterbalanced, and means for electrically heating said cooking plates and being controllable at the will of the operator.

2. In an electrical cooking machine, a base standard, upper and lower cooking plates mounted in normally counterbalanced relation on said base standard and being movable vertically and in substantially parallel relation to each other, means for releasably locking the lower cooking plate to said base standard, means for reversing the upper cooking plate on its support, means for releasably locking said upper cooking plate in its reversed position, and means for exerting a variable pressure upon said cooking plates whereby to compress the material being cooked between the plates.

3. In a cooking machine of the character described, a lower cooking plate having a cooking surface surrounded by a channel and having an upstanding marginal flange constituting the outer wall of said channel, a drain opening in said channel, a receptacle movably and detachably supported on said cooking plate beneath said drain opening in the channel thereof, an upper cooking plate in co-operative relation above said lower cooking plate, said upper cooking plate having a cooking surface opposed to the cooking surface of said lower cooking plate and a marginal depending flange to enter the channel of said lower cooking plate and co-operate in telescopic overlapping relation with the marginal flange of the lower cooking plate whereby to afford a compensating enclosure for material of different thickness being cooked between the two cooking plates, and means for supporting said cooking plates vertically movable and under variable compression in spaced cooking relation to each other.

4. In a cooking machine of the character described, an upper and a lower cooking plate, means for supporting said plates in normally counterbalanced relation whereby they are movable vertically and substantially parallel with respect to each other, said supporting means including a single pair of parallel vertical carrier members on which said cooking plates are respectively mounted centrally, a base standard, a single pair of upper and lower parallel rocking levers mounted in said base standard, said rocking levers being hingedly attached at their end portions to said vertical carrier members respectively, a rock arm mounted in said base stand and being normally movable independently of said rocking levers, an operating handle for said rock arm, a spring connection between said rock arm and a part of said supporting means for said cooking plates whereby, when said rock arm is moved in one direction, power is created to overcome the normal counterbalancing effect and exert a pressure upon said cooking plates so as to compress the material being cooked between them, and means for releasably locking said operating handle for said rock arm in different positions to which it is actuated.

HARRY R. MILLS.